O. SCHMIDT.
CHAIN CONVEYER.
APPLICATION FILED NOV. 13, 1913.
1,104,708. Patented July 21, 1914.
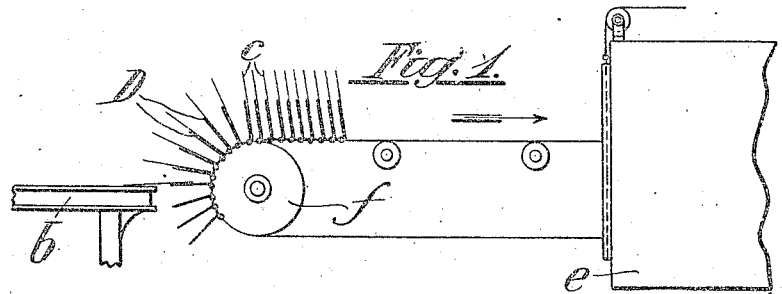
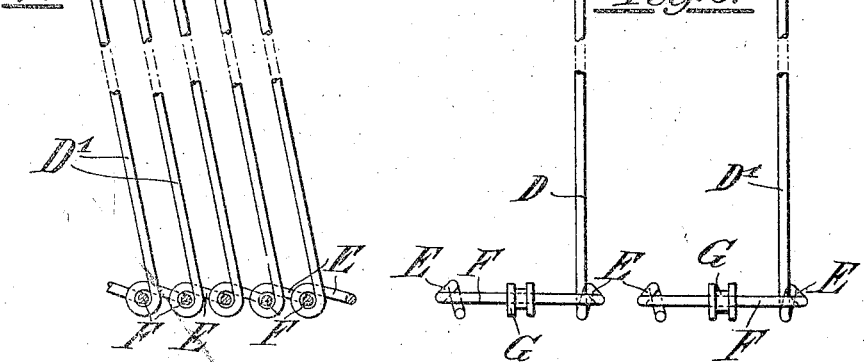
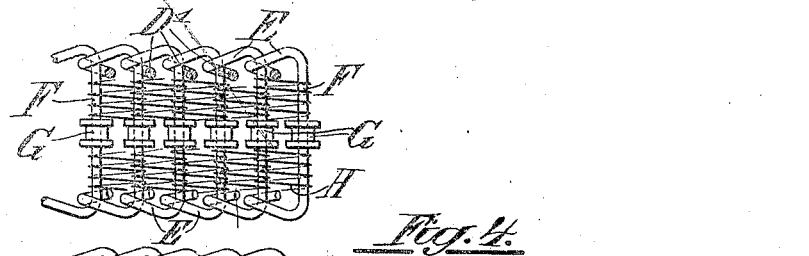
Witnesses
M. Hailes
Rd Sutton
Inventor
Otto Schmidt
By his attorney
W. P. Thompson

UNITED STATES PATENT OFFICE.

OTTO SCHMIDT, OF STUTTGART, GERMANY, ASSIGNOR TO CANNSTATTER MISCH- UND KNETMASCHINEN-FABRIK CANNSTATTER-DAMPF BACKOFENFABRIK WERNER & PFLEIDERER, OF CANNSTATT, GERMANY.

CHAIN CONVEYER.

1,104,708.

Specification of Letters Patent. Patented July 21, 1914.

Application filed November 13, 1913. Serial No. 800,829.

*To all whom it may concern:*

Be it known that I, OTTO SCHMIDT, a subject of the German Emperor, residing at Stuttgart, in the Empire of Germany, have invented certain new and useful Improvements in Chain Conveyers, of which the following is a specification.

The object of the present invention is an improved chain for conveying printed flat or rod-shaped goods in drying ovens. In such apparatus suitable tines are usually employed which stand at right angles, or nearly so, to the direction of transport, the chain being set with these tines which hold the goods to be dried in a vertical or slightly inclined position. In order that such chains may be able to receive a large number of tablets or plates on the shortest possible length and yet may be fed automatically from the stamping or printing press, various devices for guiding the tines have already been proposed which are intended to cause each tine to reach the feeding place in exactly the same position as the preceding tines. The use of guided tines of course makes such chains extremely expensive. Ordinary conveyer bands on which the tines are fixed any how are indeed cheaper, but have the disadvantage that the sheet metal tablets, plates or the like press on the tines and cause the band to bend more or less, according as to whether it is traveling over a carrying roller or hanging free. Moreover it is very difficult to prevent the freshly printed plates touching one another. In link chains of the ordinary kind in which each chain link or each chain pin carries a tine, the distance between the tines is unnecessarily large and the chain and particularly the drying oven must be made of unnecessary length, in order to enable it to receive a sufficient number of plates. Now in accordance with this invention an exact adjustment of the tines with a cheaply made chain and a close arrangement of the tines is obtained by the tines being made in one piece with the links and pins of the chain and if necessary a plurality of chains are employed which travel side by side and are displaced relatively to one another by $\frac{1}{2}, \frac{1}{3}, \frac{1}{4}$, etc., of one division.

An example of construction is shown in the accompanying drawings, in which:—

Figure 1 is a diagram of the arrangement of the chain between the press and the drying oven; Fig. 2, a side view partially in section of the chain; Fig. 3, an end view, and Fig. 4, a plan view of two chains which for the purpose of dividing the distance between the tines travel side by side and are displaced relatively to one another by half a chain division in the direction of transport.

Between the table $b$ from which the sheet metal plates $c$ or the like are pushed between the tines D, the conveyer chain travels over a chain drum $f$ into the drying passage of the oven $e$. For the sake of clearness the chain is only shown as set with tines D over a short section, between which tines the plates $c$ are placed, so that they do not rest on their freshly printed side.

As shown in Fig. 4 the entire conveyer apparatus consists of four separate chains which are arranged on both sides of a central axis indicated by a dotted line. The two inner chains lie, for example at a suitable distance $x$ from the center and are displaced, in the direction of transport, to half a chain division relatively to the two outer traveling chains. Clearly where it is not necessary to make the distance between the sheet metal plates so close, in order to utilize fully the length of the drying chamber, the two outer or the two inner chains may be employed alone.

The actual chain links consist in known manner of coiled wire H. The tines D D' of the chain are made in one piece with the link members E and the chain pins F. Each chain pin F carries a member preferably shaped like a roller G which coöperates with the teeth of the chain drum $f$.

I declare that what I claim is:—

1. A feeding chain comprising a plurality of links each of which consists of a pin one end of which is bent so as to be capable of engaging the next pin and the other end of which is bent so as to be capable of engaging the next pin and continues at right angles to the chain in the form of a tine.

2. A feeding chain comprising a plurality of links, tines formed integral with said links and substantially at right angles thereto, and wire coils wound about the pins of said links so as to form a support for the material carried by said chain.

3. A feeding mechanism comprising a plurality of chains, tines on the links of said chains, and means to move said chains parallel to one another in such manner that the tines of one chain are displaced with respect to the next chain by a distance equal to a fraction of the lengths of the links of said chains.

4. A feeding mechanism comprising a plurality of chains, tines formed integral with links of said chains, and means to move said chains parallel to one another in such manner that the tines of one chain are displaced with respect to the next chain by a distance equal to a fraction of the lengths of the links on said chains.

In witness whereof, I have hereunto signed my name this 27th day of October 1913, in the presence of two subscribing witnesses.

OTTO SCHMIDT.

Witnesses:
  FRIDA KLAIBER,
  PAULINE MÜLLER.